Sept. 10, 1968     F. C. CALDWELL     3,400,521

TRACTOR-DRAWN MOWING MACHINE

Filed May 26, 1965     3 Sheets-Sheet 1

INVENTOR
F.C. CALDWELL

BY

ATTORNEY

Sept. 10, 1968     F. C. CALDWELL     3,400,521
TRACTOR-DRAWN MOWING MACHINE
Filed May 26, 1965     3 Sheets-Sheet 2
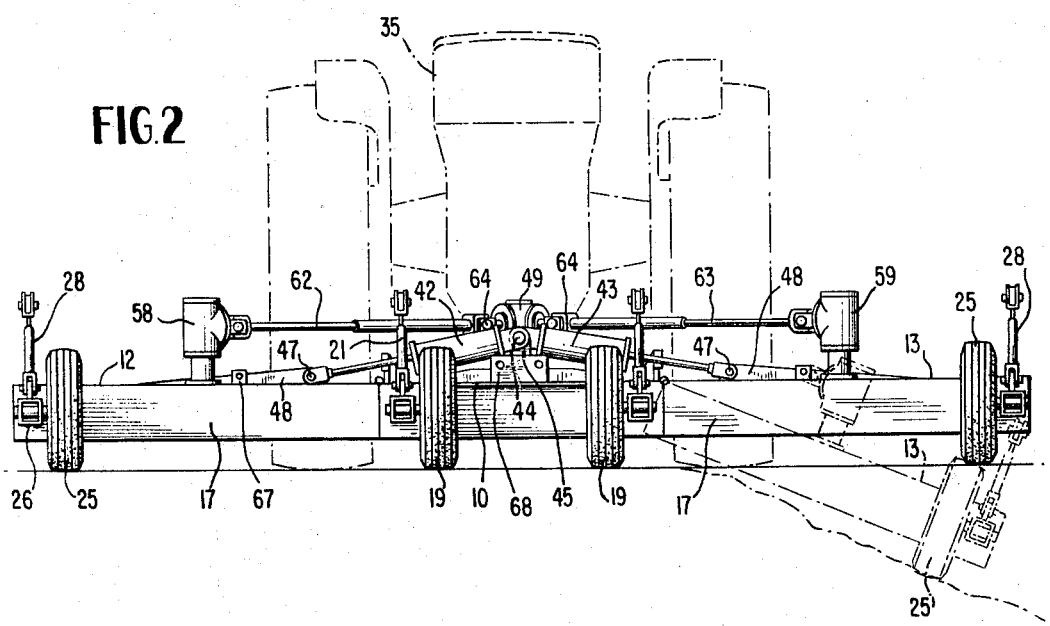
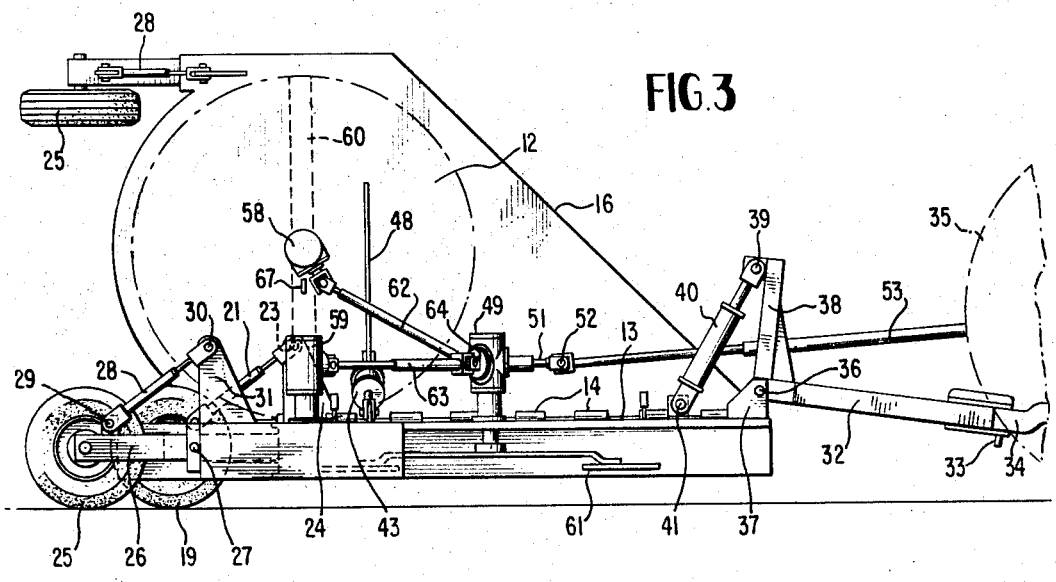
INVENTOR
F. C. CALDWELL
BY *B. P. Fishburne, Jr.*
ATTORNEY

United States Patent Office 3,400,521
Patented Sept. 10, 1968

3,400,521
TRACTOR-DRAWN MOWING MACHINE
Frederick Clay Caldwell, Corpus Christi, Tex., assignor to E. L. Caldwell & Sons, Inc., Corpus Christi, Tex., a corporation of Texas
Filed May 26, 1965, Ser. No. 458,988
3 Claims. (Cl. 56—6)

ABSTRACT OF THE DISCLOSURE

A multi-section rotary type mower including center and side sections which are hingedly connected on parallel longitudinal hinge axes. The mower structure is characterized by compactness, and the opposed cylinder-piston units which raise and lower the mower side sections are disposed in a substantially horizontal plane close to the top of the center section and beneath the telescoping drive shafts which interconnect the gear boxes of the side mower sections and a central gear box on the center section.

---

This invention relates to improvements in mowing machines.

An object of the invention is to provide a mowing machine of the large capacity tractor-drawn type capable of cutting a swath of nearly twenty feet in width through heavy undergrowth, grass, brush or the like.

A further object of the invention is to provide a tractor-drawn mower which employs a central unit and two side units or wings hinged to the central unit, each unit including a vertical axis rotary blade, and the three blades being so positioned that their swaths overlap slightly so that there is no interruption or gap in the total swath which the mower cuts.

A further object is to eliminate the necessity for intermeshing and timing of the several cutter blades by having the rotational axes of the two outboard blades set rearwardly of the rotational axis of the center blade.

Another basic objective of the invention is to provide a tractor-drawn mower which will cut evenly and operate smoothly on level, rough or rolling terrain.

Another important object is to provide a mower of the above-mentioned character whose outboard or side units may swing upwardly ninety degrees to full vertical parallel positons and also downwardly to about twenty-two degrees below the horizontal, all of this movement being accomplished with the use of single telescoping drive shafts between the center and outboard gear boxes, as distinguished from the much more costly and complicated double telescoping drive shafts which are normally necessary to facilitate such a wide range of movement of the wing units.

Still another object is to provide a tractor-drawn mower which is fully adjustable as to height and leveling and including a simplified and novel arrangement of lifting and lowering cylinder piston units for the wing units of the mower.

Other objects and advantages of the invention will be apparent during the course of the following detailed description.

In the accompanying drawings forming a part of this application and in which like numerals are employed to designate like parts throughout the same:

FIGURE 2 is a rear end elevation of the machine;

FIGURE 3 is a side elevation thereof with one wing unit fully elevated; and

Figure 1:
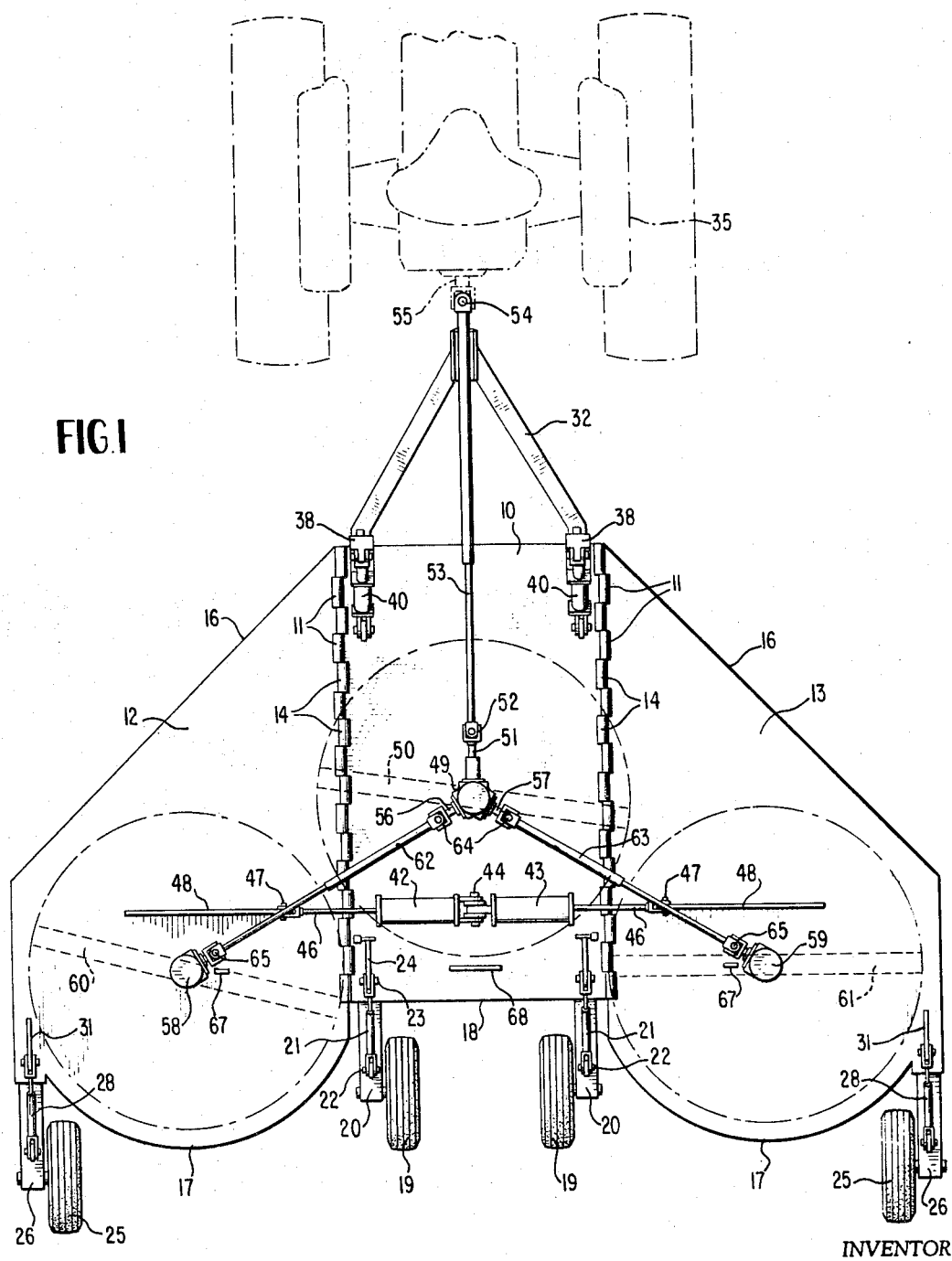
FIGURE 1 is a plan view of a mowing machine embodying the invention.

In the drawings, wherein for the purpose of illustration is shown a preferred embodiment of the invention, the numeral 10 designates a central rectangular horizontal panel or cover section having hinge knuckles 11 formed thereon along its opposite longitudinal sides. The side or outboard wing cover sections 12 and 13 have coacting hinge knuckles 14 along their inner longitudinal edges to interfit with the knuckles 11 and receive therethrough suitable pintles 15. The forward ends of cover sections 12 and 13 are diagonally formed and converge forwardly as indicated at 16. The side cover sections 12 and 13 have rear curved blade housing walls 17 which project substantial distances rearwardly of the rear transverse edge 18 of the central cover section 10.

The rear end of central cover section 10 is supported by a spaced pair of wheels 19, journaled upon legs 20, which are suitably pivoted to the cover section 10. Conventional screw jacks 21 have their lower ends pivoted at 22 to the legs 20 and have their upper ends pivoted at 23 to upstanding brackets 24, rigid with the cover section 10 near the rear corners thereof. Adjustment of these screw jacks serves to raise and lower the rear end of the central cover section 10 relative to the ground and to lock the same securely in selected adjusted positions.

In like manner, the rear outer corners of the wing cover sections 12 and 13 are supported by wheels 25, spaced rearwardly of the wheels 19 and journaled upon rearwardly extending legs 26, suitably pivoted at 27 to the cover sections 13. The wheels 25 are raised and lowered by screw jacks 28 whose lower ends are pivoted at 29 to the legs 26 and whose upper ends are similarly pivoted at 30 to upstanding brackets 31, rigidly mounted upon the cover sections 12 and 13. It will be noted in the drawings that all of the wheels 19 and 25 are mounted rearwardly of the rotary blade axes and the two outboard wheels 25 are spaced rearwardly of the center unit wheels 19. By means of the several screw jacks 21 and 28, the rear end of the mower is fully adjustable with respect to cutter height and leveling.

The forward end of the mower is supported during operation by a draft tongue 32 whose forward end is connected as at 33 to a tractor drawbar 34, the tractor being shown at 35 in broken lines. The rear end of tongue 32 is pivoted to the forward end of central cover section 10 by a pair of pivot pins 36 mounted in brackets 37 rigid with the center cover section. The tongue carries at its rear end a pair of rigid upstanding arms 38 whose top ends are pivoted at 39 to a pair of adjusting cylinder piston units 40 having their lower ends pivoted at 41 to the center cover section 10. The units 40 are conventionally operated from the tractor hydraulic system to adjust the height of the forward end of the mower and lock the same at the desired elevation. Optionally, screw jacks may be employed in lieu of the fluid pressure cylinder piston units 40.

Simplified means are provided to raise and lower the side cutter units including cover sections 12 and 13 on the axes of the two longitudinal hinges 15. This means comprises a pair of substantially horizontal transversely extending cylinder piston units 42 and 43 which lie relatively close to the top of the mower above the cover section 10. The inner opposed ends of the units 42 and 43 are mounted upon a common pivot element 44, supported on rigid bracket means 45 atop the cover section 10. The piston rods 46 of these hydraulic units have their outer ends pivotally connected at 47 with webs 48, rigidly secured by welding or the like to the tops of outboard cover sections 12 and 13 near and forwardly of the centers of the latter. The units 42 and 43, as shown in FIGURE 1, are arranged near the rear portion of center cover section 10 and in between the vertical cutter axis of the center unit and the cutter axes of the side mower units. The units 42 and 43 are conventionally operated to raise and lower the side mower units and to lock them hydraulically in selected adjusted positions or to render the side units free floating so that they may follow irregularities in the terrain. The hydraulic system of the tractor is employed along with a conventional three spool hydraulic control valve, not shown, for the purpose of regulating the units 42 and 43 and also the front units 40, if such are employed. Since these hydraulic controls are conventional and well known in the art, there is no necessity for illustrating them or describing them in this application.

Figure 4:
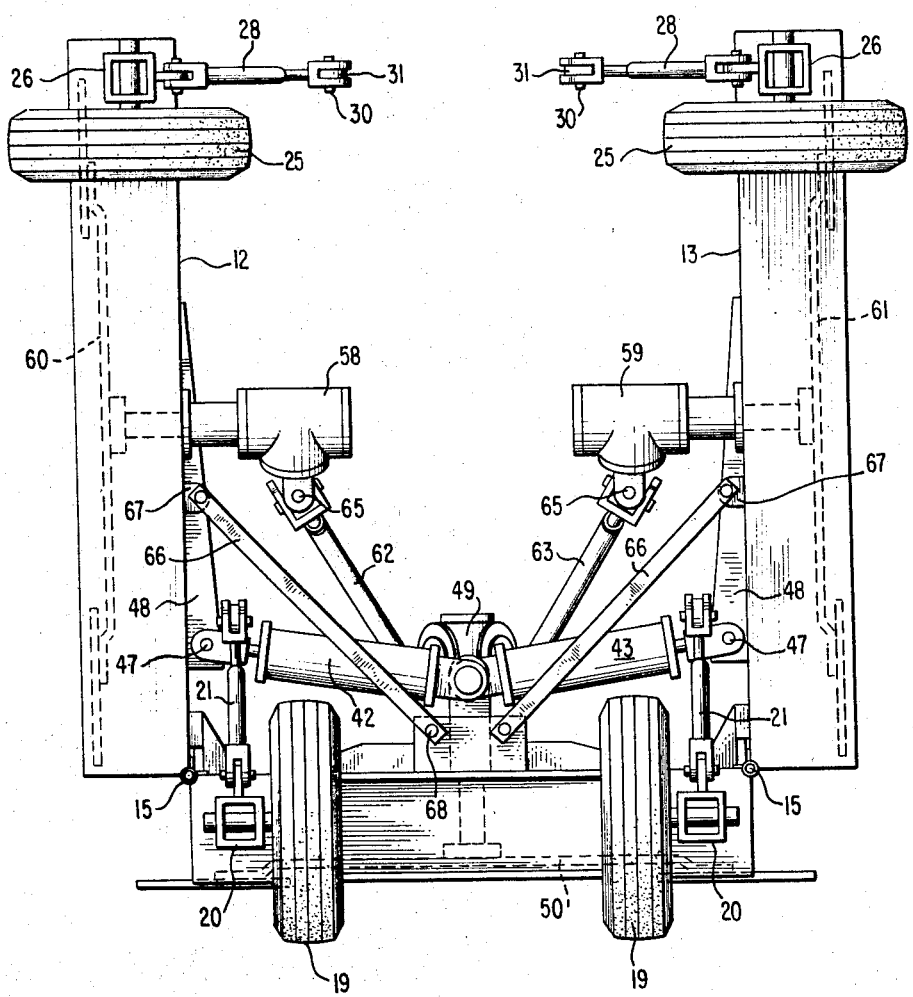
FIGURE 4 is a rear elevation of the machine with both wing units fully elevated and locked in the elevated position.

A very important feature of the invention resides in the driving means for the three rotary blades or cutters, enabling the cutters to operate on various types of terrain and allowing full elevation of the side cutter units to vertical positions as depicted in FIGURE 4. As will be described, the full range of movement of the side cutter units on the hinges 15 is achieved under the invention by the use of simple telescoping drive shaft and universal joint units, each having a single telescoping construction only, as distinguished from the much more complex and costly double telescoping drive shafts which have heretofore been required to achieve a full range of movement of the side or wing units of the mower.

The driving means for the cutters comprises a central bevel gear box 49 on the central cover section 10, directly driving the center vertical axis horizontal cutter blade 50 of the mower, which cutter blade spans a central area of the machine as shown in FIGURE 1. The gearing within the box 49 is powered by an input shaft 51 extending forwardly and longitudinally and connected by a universal joint 52 with a single telescoping type extensible drive shaft 53, connected through another universal joint 54 with the power take-off shaft 55 of tractor 35. As shown in FIGURE 3, the main longitudinal drive shaft 53 is slightly inclined and is spaced somewhat above the central section 10 of the mower cover or housing. It can be noted in FIGURE 3 that the gear box 49 is elevated as is the input shaft 51 thereto. The elevation of the three gear box shafts is important in the proper operation of the driving means.

The gear box 49 has two rearwardly diverging output shafts 56 and 57 at the same elevation as the input shaft 51 and spaced 120 degrees therefrom and from each other. Side cutter driving gear boxes 58 and 59 are mounted centrally on the cover sections 12 and 13 and considerably rearwardly of the center gear box 49, as shown. The gear boxes 58 and 59 have dependent output shafts to drive the side cutter blades 60 and 61 simultaneously with the driving of the blade 50. As shown in FIGURE 1, the three cutter blades do not intermesh and therefore do not have to be timed. However, their circular paths overlap longitudinally so that the three blades will cut an uninterrupted wide swath through material being mowed.

A pair of single telescoping drive shafts 62 and 63 extend from the output shafts 56 and 57 and have forward universal joints 64, as indicated. At their rear ends, the telescoping drive shafts have second universal joints 65 connected with the input shafts of side gear boxes 58 and 59. The side gear boxes 58 and 59 and their input shafts are elevated the same amount as the center gear box 49 above the mower cover or housing, FIGURES 2 and 3. It is emphasized that the drive shafts 62 and 63 need not be of the expensive and especially designed double telescoping joint type, and the geometry of the machine permits the use of the single telescoping type drive shafts while allowing the side mower units to be elevated to vertical, FIGURE 4, and to be lowered well below the horizontal, approximately 22 degrees therebelow, as indicated by broken lines in FIGURE 2. In the prior art, unless the very costly mentioned type of drive shafts are employed, it has been necessary to unduly restrict the swinging movement of the side or outboard mower units so that they cannot rise to vertical positions or swing well below the horizontal.

A number of factors contribute to making the simplified construction and mode of operation of the invention possible. These factors include the spacing and elevation of the output shafts 56 and 57 relative to the axes of the hinges 15, the lateral spacing of the hinge axes from the center line of the main gear box, the spacing of the side gear boxes 58 and 59 from the main gear box 49 and from the hinge axes. It should also be mentioned that the single telescoping drive shafts are standard commercial items available on the market and they may be cut to desired lengths with relatively little expense, and are therefore ideally suited for production purposes.

In FIGURE 4 which shows the side mower units 12 and 13 fully elevated, there is depicted a pair of links or bars 66 which are temporarily connected diagonally between small lugs 67 on the side units and a bracket 68 on the center mower unit. The links 66 serve to securely lock the side units up vertically for safety purposes, as where the mover is traveling along a highway.

In light of the above description, it is thought that the operation of the mower for cutting brush or grass on level or uneven terrain is quite obvious. The mower is pulled by the tractor and power for driving the three cutter blades in unison is derived from the power take-off shaft 55 and transmitted through the drive shaft 53 to the center gear box 49 and from this gear box through the shafts 62 and 63 to the side gear boxes 58 and 59.

The side mower units are capable of rising and falling to follow the contours of the ground because of their hinged relation to the center mower section. By operating the opposed cylinder units 42 and 43, the side sections may be elevated to the vertical positions of FIGURE 4 when desired, as fully explained. The hydraulic controls are substantially conventional.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A mower of the tractor-drawn type comprising a center section having rear end ground-engaging wheels and a forward tongue for connection with a tractor, side sections hingedly secured to said center section on parallel longitudinal hinge axes so that the side sections may swing vertically above and below the horizontal, ground-engaging wheels on the side sections near their rear ends, a main gear box on the center section centrally thereof and midway between said hinge axes and having input and output shafts which are elevated from the center section and spaced apart 120 degrees circumferentially with the output shafts diverging rearwardly and the input shaft extending forwardly longitudinally, drive shaft means interconnecting said input shaft of the main gear box with power take-off means of the tractor, side gear boxes mounted centrally upon the side sections rearwardly of the main gear box and spaced laterally outwardly of the hinge axes equidistantly, single telescoping type drive shafts interconnecting said output shafts of the main gear box and input shafts of the side gear boxes, vertical axis rotary cutter blades on the center and side sections driven from the center and side gear boxes, power means for raising said side sections to vertical positions on said hinge axes, said side sections being swingable from said vertical positions to positions substantially below the horizontal plane of the center section without over-collapsing or over-extending said extensible drive shafts, said power means for raising said side sections being comprised of a pair of opposed generally horizontal transversely extending cylinder-piston units having their inner ends connected with a common pivot element on the center section rearwardly of and coaxially aligned with the power take-off means and the main gear box forwardly of the side gear boxes with their outer ends directly pivotally secured to said side sections, said cylinder-piston units further lying relatively close to the top of the center section and in a horizontal plane beneath said single telescoping type drive shafts.

2. The invention as defined by claim 1, and mechanical means to positively lock the side mower sections in said vertical positions.

3. The invention as defined by claim 2, and wherein said mechanical means includes a pair of diagonal rigid links interconnecting the center and side mower sections while the side sections are raised.

References Cited

UNITED STATES PATENTS

| | | | |
|---|---|---|---|
| 2,690,040 | 9/1954 | Miller et al. | 56—6 |
| 2,952,961 | 9/1960 | Engler | 56—6 |
| 3,061,955 | 11/1962 | Violette | 37—143 |
| 3,115,738 | 12/1963 | Engler | 56—6 |

ABRAHAM G. STONE, *Primary Examiner.*

P. A. RAZZANO, *Assistant Examiner.*